US011570517B2

(12) United States Patent
Sodagar

(10) Patent No.: US 11,570,517 B2
(45) Date of Patent: Jan. 31, 2023

(54) APPLICATION INTENDED INTERACTIVE SELECTION INFORMATION FOR INTERACTIVE PLAYBACK OF DASH CONTENT

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 51 days.

(21) Appl. No.: 17/242,863

(22) Filed: Apr. 28, 2021

(65) Prior Publication Data

US 2021/0400353 A1 Dec. 23, 2021

Related U.S. Application Data

(60) Provisional application No. 63/042,946, filed on Jun. 23, 2020.

(51) Int. Cl.
*H04N 21/472* (2011.01)
*H04N 21/4402* (2011.01)
*H04N 21/235* (2011.01)

(52) U.S. Cl.
CPC ... *H04N 21/47217* (2013.01); *H04N 21/2353* (2013.01); *H04N 21/44029* (2013.01)

(58) Field of Classification Search
None
See application file for complete search history.

(56) References Cited

U.S. PATENT DOCUMENTS

| | | | |
|---|---|---|---|
| 9,009,619 B2 * | 4/2015 | Bloch | G11B 27/34 715/772 |
| 9,082,092 B1 | 7/2015 | Henry | |
| 2006/0064733 A1 * | 3/2006 | Norton | H04N 21/42646 725/135 |
| 2014/0282013 A1 * | 9/2014 | Amijee | G06F 3/0482 715/732 |
| 2014/0365556 A1 | 12/2014 | Rehan et al. | |
| 2016/0134900 A1 | 5/2016 | Wei et al. | |
| 2016/0323608 A1 * | 11/2016 | Bloch | H04N 21/26258 |
| 2018/0041820 A1 | 2/2018 | Xu et al. | |
| 2018/0077210 A1 * | 3/2018 | Hannuksela | H04L 65/60 |

OTHER PUBLICATIONS

International Search Report dated Sep. 14, 2021 in International Application No. PCT/US2021/034540.

(Continued)

*Primary Examiner* — Jason K Lin
(74) *Attorney, Agent, or Firm* — Sughrue Mion, PLLC

(57) ABSTRACT

There is included a method and apparatus comprising computer code configured to cause a processor or processors to perform providing a media presentation description (MPD) event and media segments of video content to be streamed to a client, controlling the client to provide a user interface based on the MPD event and comprising a plurality of selection choices and interactive data for each of the selection choices, and updating MPD data based on at least one selection from the selection choices through the user interface.

20 Claims, 10 Drawing Sheets

(56) References Cited

OTHER PUBLICATIONS

Written Opinion of the International Searching Authority dated Sep. 14, 2021 in International Application No. PCT/US2021/034540.
Karim El Assal et al., "Viewport-driven DASH Media Playback for Interactive Storytelling: a seamless non-linear storyline experience", Conference Paper, ResearchGate, 2019, pp. 304-307, Retrieved from: URL: <https://dl.acm.org/doi/abs/10.1145/3304109.3323839> (5 pages total).
Demostenes Z Rodriguez et al., "The impact of video-quality-level switching on user quality of experience in dynamic adaptive streaming over HTTP", EURASIP Journal on Wireless Communications and Networking, 2014, pp. 1-15, Retrieved from: URL: <https://jwcn-eurasipjournals.springeropen.com/articles/10.1186/1687-1499-2014-216> (16 pages total).
Thomas Stockhammer, "Editor's Version of DASH Is 4th Edition", Qualcomm Incorporated, International Organisation for Standardisation Organisation Internationale De Normalisation, ISO/IEC JTC1/SC29/WG11, Coding of Moving Pictures and Audio, MPEG2019/m52458, Jan. 2020, 287 pages, Brussels, BE.
Iraj Sodagar, "Technologies under Consideration for Dynamic Adaptive Streaming over HTTP 23009, Parts 1, 3, 4, 5 and 6", Systems subgroup, International Organisation for Standardisation Organisation Internationale De Normalisation, ISO/IEC JTC1/SC29/WG11, Coding of Moving Pictures and Audio, MPEG2020/N19248, Apr. 2020, pp. 1-76, Alpbach, AT.
Emmanuel Thomas et al., "DASH signalling for OMAF Viewpoint switch", International Organisation for Standardisation Organisation Internationale de Normalisation, 2019, ISO/IEC JTC1/SC29/WG11 MPEG2019/m51635, Brusells, BE, Coding of Moving Pictures and Audio (6 pages total).
Extended European Search Report dated Sep. 6, 2022 in European Application No. 21828963.5.

\* cited by examiner

APPLICATION INTENDED INTERACTIVE SELECTION INFORMATION FOR INTERACTIVE PLAYBACK OF DASH CONTENT

CROSS REFERENCE TO RELATED APPLICATION

The present application claims priority to provisional application U.S. 63/042,946, filed on Jun. 23, 2020, the contents of which are hereby expressly incorporated by reference, in their entirety, into the present application.

BACKGROUND

1. Field

The present disclosure is directed to dynamic adaptive streaming over HTTP (DASH) events for interactive playback.

2. Description of Related Art

In MPEG DASH, a single manifest may represent only a single storyline, and even if it is possible to update the manifest to change the storyline, the story map would need to be maintained outside of the manifest by an application.

If connections in a story map were delivered using Media Presentation Description (MPD) events, then a storyline may change to a user-choice such that the presentation continues based on user decisions chosen at certain moments after playback of the presentation.

In DASH, if a manifest were to be updated with a single period during which, near or at the end of that period, the application requests a user selection to determine to update the manifest with a new period to carry out the story accordingly, then there is a technical problem that, since all content may be on-demand and all period elements may be stored in a remote server, even if a dynamic manifest is created by adding periods sequentially based on user selections a callback may be made at the end of every period to update the manifest. This may be technically problematic based on network parameters, such as latency with respect to unused buffering that could have occurred if the user selections occurred earlier, and also with respect to practicability of user selections hindered by lack of visual guidance to the user at least at the time of the respective selections.

SUMMARY

To address one or more different technical problems, this disclosure provides technical solutions to reduce network overhead and server computational overheads while delivering an option to apply various operations to the resolved element such that in using these operations some of practicality and technical provision of a storyline video may be improved.

There is included a method and apparatus comprising memory configured to store computer program code and a processor or processors configured to access the computer program code and operate as instructed by the computer program code. The computer program code comprises providing code configured to cause the at least one processor to provide a media presentation description (MPD) event and media segments of video content to be streamed to a client, controlling code configured to cause the at least one processor to control the client to provide a user interface based on the MPD event and comprising a plurality of selection choices and interactive data for each of the selection choices, and updating code configured to cause the at least one processor to update MPD data based on at least one selection from the selection choices through the user interface, wherein each of the selection choices indicates respectively different ones of periods of a plurality of storylines of the video content, and wherein controlling the client to provide the user interface comprises providing the user interface before at least a completed playback of at least one other period of the storylines that is prior to the different ones of the periods.

According to exemplary embodiments, providing the MPD event comprises providing the client with a story map identifying the one other period, the different ones of the periods, and at least one later period of the video content, and the story map indicates that one other period is scheduled to be streamed before the different ones of the periods which are scheduled to be streamed before the at least one later period of the video content.

According to exemplary embodiments, at least one of the one other period, the different ones of the periods, and the at least one later period comprises a different duration than at least one other of the one other period, the different ones of the periods, and the at least one later period.

According to exemplary embodiments, controlling the client to provide the user interface comprises controlling the user interface to display at least a portion of the story map, and wherein the portion of the story map comprises an indication of the one other period and indications of the different ones of the periods.

According to exemplary embodiments, controlling the client to provide the user interface comprises controlling the user interface to identify a position of the at least one selection at a point between the indication of the one other period and the indications of the different ones of the periods.

According to exemplary embodiments, controlling the user interface to display at least the portion of the story map comprises displaying the at least portion of the story map based on a connection map, the connection map comprises a listing including each of the one other period, the different ones of the periods, and the at least one later period, the connection map further comprises first respective identifiers for each connection from the one other period to the different ones of the periods, and the connection map further comprises a second respective identifier for at least one connection from at least one of the different ones of the periods to the at least one later period.

According to exemplary embodiments, controlling the client to provide the user interface comprises controlling the user interface to display an entirety of the story map, and the entirety of the story map comprises an indication of the one other period, indications of the different ones of the periods, and an indication of the at least one later period.

According to exemplary embodiments, controlling the client to provide the user interface comprises controlling the user interface to identify a position of the at least one selection at a point between the indication of the one other period and the indications of the different ones of the periods, and controlling the client to provide the user interface further comprises controlling the user interface to identify another position of another selection at a point between at least one of the indications of the different ones of the periods and the indication of the at least one later period.

According to exemplary embodiments, controlling the user interface to display the entirety of the story map comprises displaying the entirety of the story map based on a connection map, the connection map comprises a listing including each of the one other period, the different ones of the periods, and the at least one later period, the connection map further comprises first respective identifiers for each connection from the one other period to the different ones of the periods, and the connection map further comprises a second respective identifier for at least one connection from at least one of the different ones of the periods to the at least one later period.

According to exemplary embodiments, the client is a dynamic adaptive streaming over HTTP (DASH) client.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
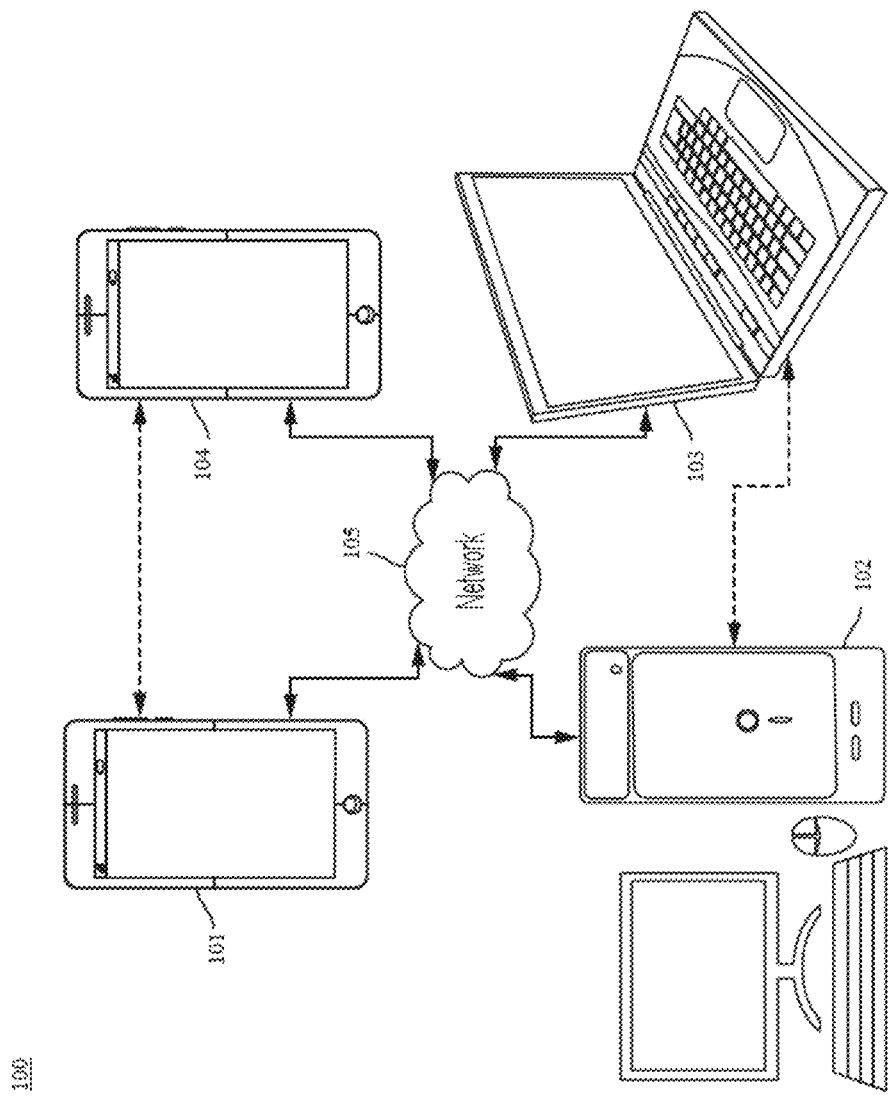
FIG. 1 is a simplified schematic illustration in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
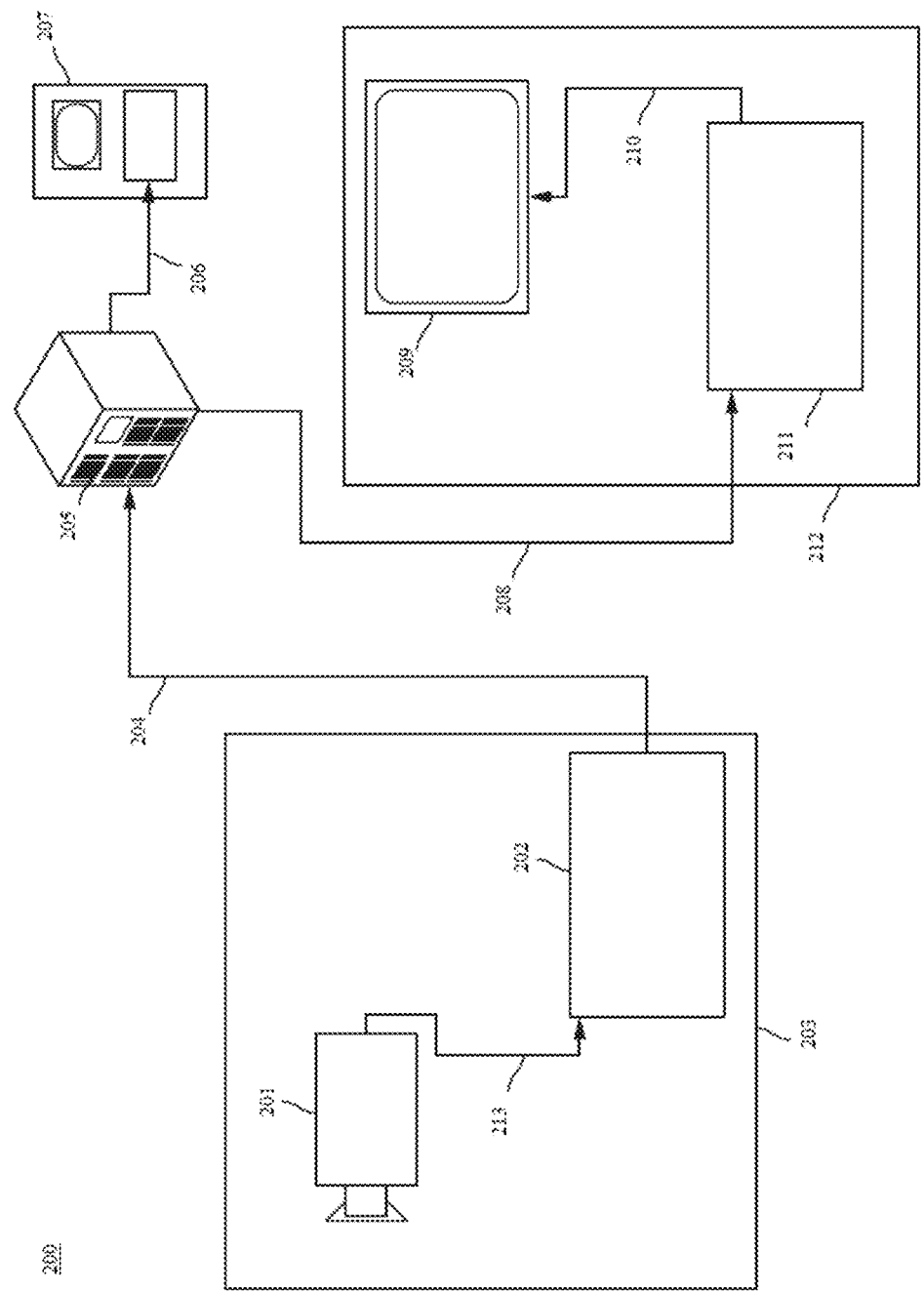
FIG. 2 is a simplified schematic illustration in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
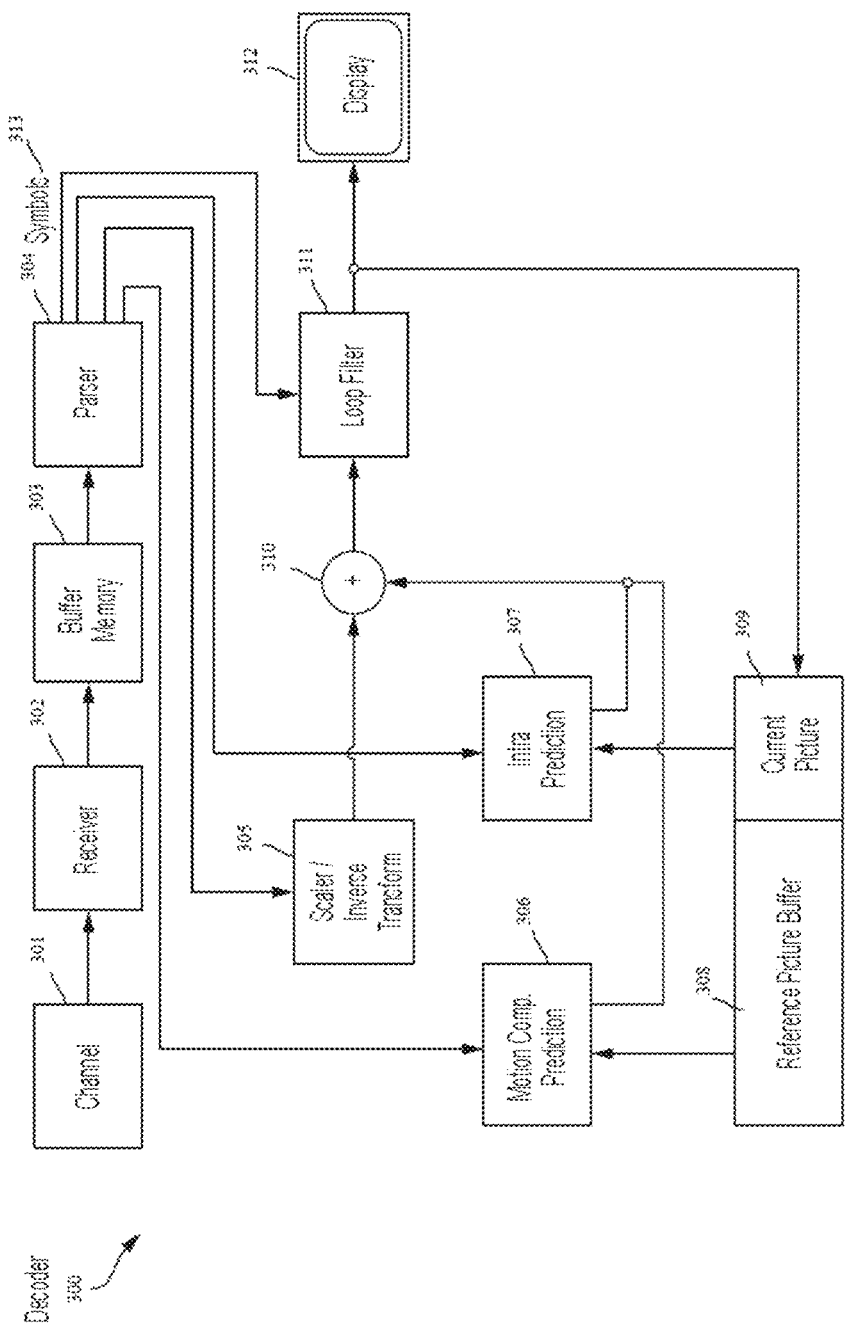
FIG. 3 is a simplified block diagram regarding decoders in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec.

H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
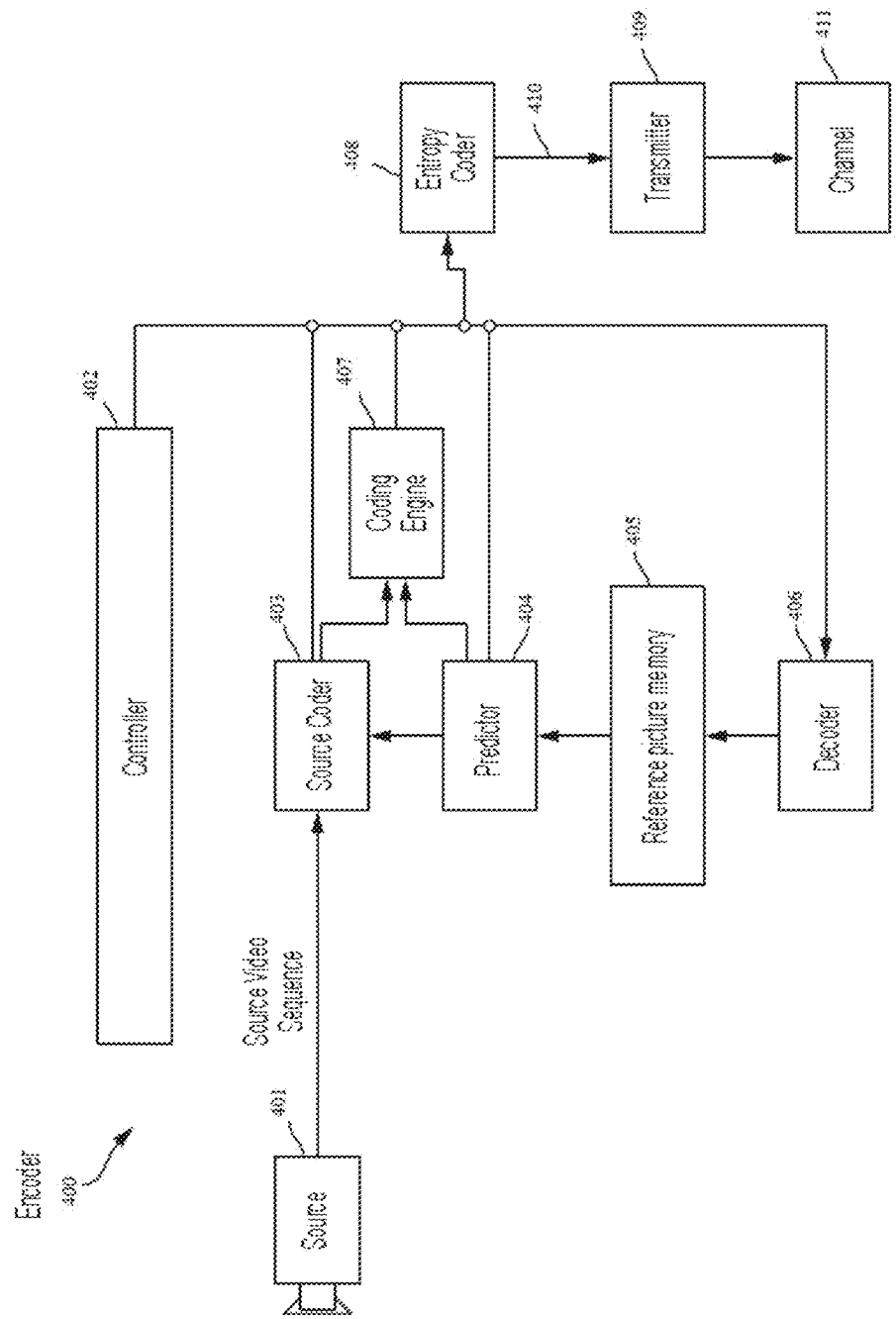
FIG. 4 is a simplified block diagram regarding encoders in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
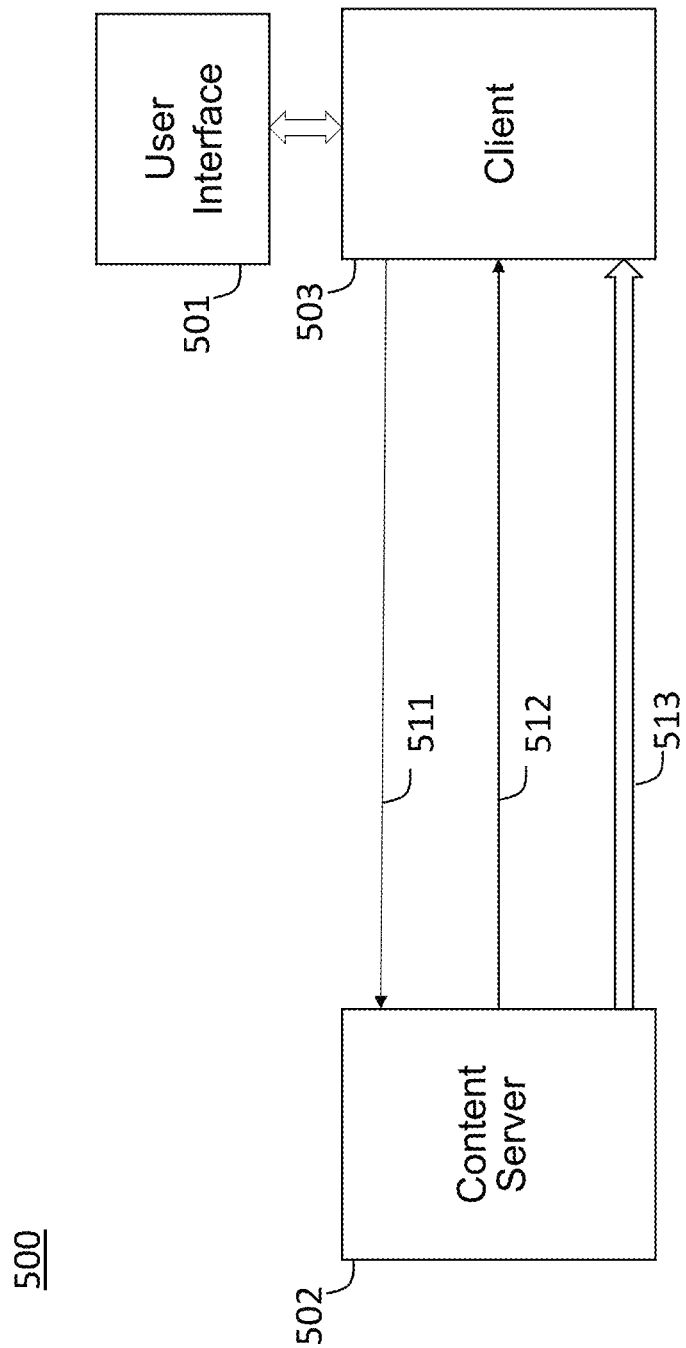
FIG. 5 is a simplified block diagram in accordance with embodiments.

FIG. 5 illustrates a simplified block diagram 500 according to exemplary embodiments in which there is a content server 502, a client 503, and a user interface 501. The client 503 communicates one or more selection callbacks 511, described below, to the content server 502, and the content server 502 responds, as described below, with media presentation description (MPD) updates 512 and one or more media segments 513.

For example, according to exemplary embodiments in view of FIG. 5, the content server 502 provides initial MPD and MPD updates 512 as well as the media segments 513 to a DASH client, such as client 503, and whenever the client 503 receives a storyline event as part of MPD updates 512, the client 503 may expose this event to the user interface 501 to provide it to a user such that when the user decides on a choice, the user interface 501 informs the client 503, and the client 503 provides the selection, one or more selection callbacks 511, to the content server 502 so that the content server 502 updates the MPD accordingly. Such embodiments represent an architecture herein of an interactive storyline in DASH streaming as described further below.

Further, such storyline event may be defined with respect to an MPD storyline EventStream such that an MPD storyline event may be an MPD event carrying one or more selection points in a story map, described below, and an event scheme may be identified with a schemeIdUri such as ""urn:mpeg:dash:manifest-storyline-event:2020", and only one EventStream element may be allowed per Period, carrying these events that shall use this URI in their @schemeIdUri. An EventStream@value may ignored by the client 503, i.e. no sub-scheme may be defined for such event stream.

Further, such storyline event may be further defined with respect to an Event element of such MPD storyline EventStream so as to include a connection element, as shown below in Table 1 (Extended Event Semantics to support Playlist Event):

TABLE 1

| Element or Attribute Name | Use | Description |
|---|---|---|
| Event | | specifies an Event and contains the message of the event. The content of this element depends on the event scheme. The contents shall be either: A string, optionally encoded as specified by @contentEncoding XML content using elements external to the MPD namespace For new event schemes string content should be used, making use of Base 64 encoding if needed. Note: The schema allows "mixed" content within this element however only string data or XML elements are permitted by the above options, not a combination. |
| @presentationTime | OD default: 0 | specifies the presentation time of the event relative to the start of the Period taking into account the @presentationTimeOffset of the Event Stream, if present. The value of the presentation time in seconds is the division of the value of this attribute and the value of the @timescale attribute. If not present, the value of the presentation time is 0. This value defines the start time of active duration when the user can make the selection. |
| @duration | O | specifies the presentation duration of the Event. The value of the duration in seconds is the division of the value of this attribute and the value of the @timescale attribute. The interpretation of the value of this attribute is defined by the scheme owner. If not present, the value of the duration is unknown. This value defines the duration in which the user can make a selection for this event. |
| @id | O | specifies an identifier for this instance of the event. Events with equivalent content and attribute values in the Event element shall have the same value for this attribute. The scope of the @id for each Event is with the same @schemeIdURI and @value pair. |
| @contentEncoding | O | specifies whether the information in the body and the information in the @messageData is encoded. If present, the following value is possible: base64 the content is encoded as described in IETF RFC 4648 prior to adding it to the field. If this attribute is present, the DASH Client is expected to decode the message data and only provide the decoded message to the application. This attribute may not be used in the Storyline event. |
| @messageData | O | specifies the value for the event stream element. The value space and semantics must be defined by the owners of the scheme identified in the @schemeIdUri attribute. NOTE: the use of the message data is discouraged by content authors, it is only maintained for the purpose of backward-compatibility. Including the message in the Event element is recommended in preference to using this attribute. This attribute is expected to be deprecated in the future editions of this document. This attribute may not be used in the Storyline Event. |
| @callbackUrl | O | Specifies the URL for DASH client to make an HTTP GET request with query "nextPeriod = id", in which id is the selected @id value by user interface. The default is MPD@Location. |
| @replace | O | If 'true', then this event is an update of all previous events in this session and the connection map replaces the previous connection maps. |
| Connection | 1 . . . N | Specifies the connection map |

Key
For attributes:
M = Mandatory,
O = Optional,
OD = Optional with Default Value,
CM = Conditionally Mandatory
For elements:
<minOccurs> . . . <maxOccurs> (N = unbounded) Elements are bold; attributes are non-bold and preceded with an @.

Further, there may also be an Interconnection element including or consisting of a set of links showing connections as follows in Table 2 (Playlist Semantics) according to exemplary embodiments:

TABLE 2

| Element or Attribute Name | Use | Description |
| --- | --- | --- |
| Interconnection | 0 . . . N | |
| @from | O | identifier of a connected-from Period. This value shall be unique among @from and @to attributes in the scope of this MPD. The default is the parent Period. |
| @to | M | identifier of the connected-to Period. This value shall be unique among @from and @to attributes in the scope of this MPD. |
| @data | O | Interactive data for the application for the @to period. The interactive data may exist in the body, and if it does, it takes precedent to this attribute. |
| @dataEncoding | O | specifies whether the information in the body and the information in the @interactiveData is encoded. If present, the following value is possible: base64 the content is encoded as described in IETF RFC 4648 prior to adding it to the field. If this attribute is present, the DASH Client is expected to decode the message data and only provide the decoded message to the application. |

Key
For attributes:
M = Mandatory,
O = Optional,
OD = Optional with Default Value,
CM = Conditionally Mandatory
For elements:
<minOccurs>. . . <maxOccurs> (N = unbounded) Elements are bold; attributes are non-bold and preceded with an @.

As an example, a Connection element, an Interconnection element, of a Storyline event at P0 Period in any of FIGS. 6, 8, 9A, and 9B may be represented by one of the followings exemplary cases:

Exemplary Case A
<Interconnection @to="1" @data="Bill kills Alice">
<Interconnection @to="2" @data="Bill kisses Alice">
<Interconnection @to="3" @data="Bill misses Alice">
OR
Exemplary Case B
<Interconnection @from ="0" @to="1" @data="Bill kills Alice">
<Interconnection @from ="0" @to="2" @data="Bill kisses Alice">
<Interconnection @from ="0" @to="3" @data="Bill misses Alice">

According to exemplary embodiments, one or more Interconnection elements can be included in one Storyline Event, and multiple connection elements can provide a part of or the entire story map of the current session wherein only the interconnection map at the end of the current Period element may be active for selection during the duration of the event as described further below. For example, viewing FIGS. 6, 8, 9A, and 9B, even if only the selection S0 is active for selection at some time, any of the maps 600, 800, 900A, and 900B may be displayed to the client depending on various criteria that may be predetermined as user and/or server settings for example.

As such, after the user, at user interface 501, makes a selection, the client 503 makes an HTTP GET request to the URL address defined by the Event element via the selection callback 511, and the selected Period @to value may include in a query parameter of such request. Accordingly, at the content server 502, the manifest may be updated based on the user selection where the user selection can be provided out of band or using said callback function according to exemplary embodiments.

Figure 6:
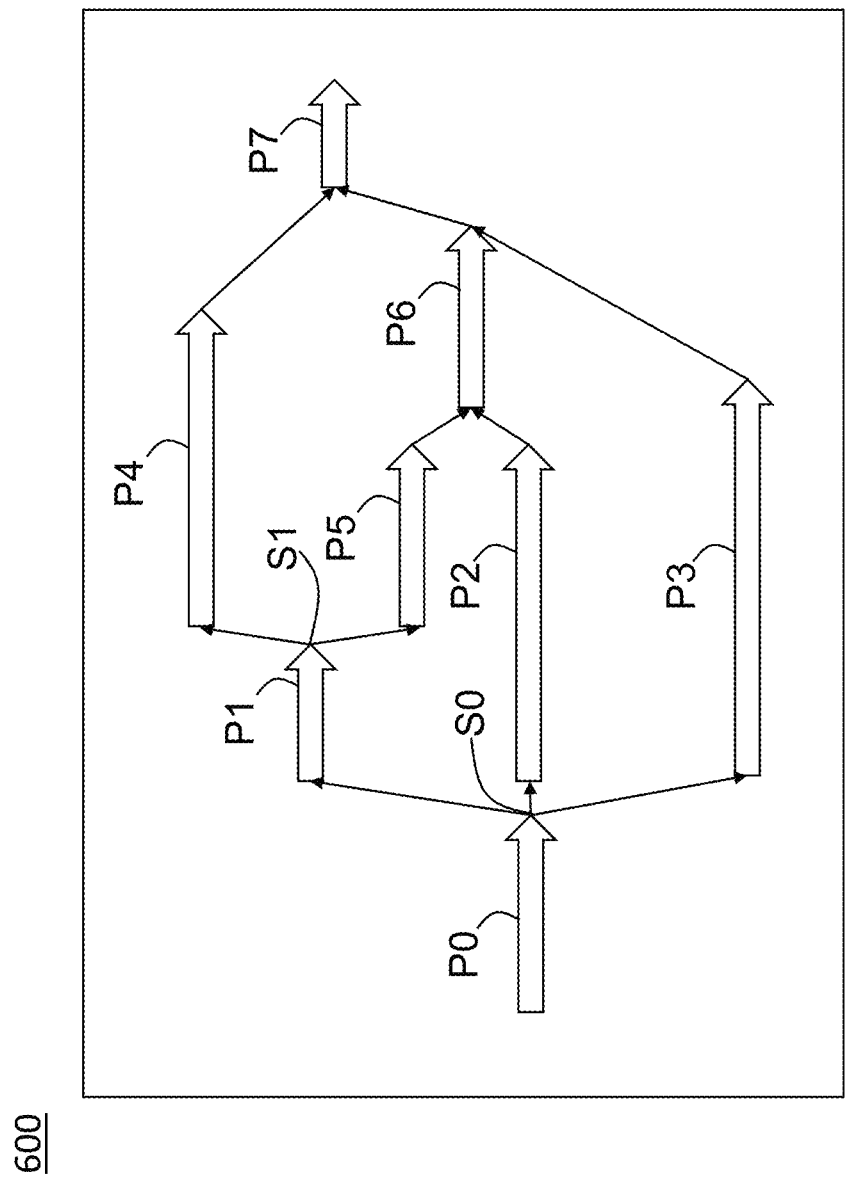
FIG. 6 is a simplified diagram in accordance with embodiments.

FIG. 6 is a map 600 in accordance with embodiments in which there is illustrated various story map MPD segments such as segment period P0, which spits at selection point S0, to segment periods P1, P2, and P3, where the duration, as indicated by length, of periods P1, P2, and P3 may be different; of course, one or more of those segments may be of a same duration depending on respective MPD segments. Further, segment period P1 may split, at selection point S1, to segment periods P4 and P5, where segment periods P5 and P2 may merge to segment period P6, and segment periods P4, P6, and P3 may merge to segment period P7. The duration of said segment periods P1-P7 may be the same or may be different.

That is, in FIG. 6, the story starts with the period P0 where at the end of period P0 at selection point S0, the story can go to periods P1, P2, or P3 each with at least some relatively different content and possibly of different duration. At the end of period P1 and at selection point S1, the story, as exemplified in FIG. 6, has choices of period P4 or period P5. The rest of the illustrated story periods P6 and P7 occur after merging of various branches. Of course, the various branches need not necessarily merge. According to exemplary embodiments, a number of choices at each selection point may be set to two or more. Also, a duration of each branch may not necessarily be equal, and there might be merging of branches of any of same and different durations. Further, the story might have one or more endpoints according to exemplary embodiments. As in FIG. 6, it may be considered that the period P7 could be an endpoint at which, after playing an MPD segment thereof, may end the story.

According to exemplary embodiments, such story may be defined with respect to a rich connection map (e.g. Table 3 (an example of a connection map with interactive data)) with interactive data which may not only provide the connections between periods but also may provide interactive information about the connected-to periods, where, such map may be described as an example Table 3:

TABLE 3

| From P0 | To: P1, with ID1 |
|---|---|
|  | To P2, with ID2 |
|  | To P3, with ID3 |
| From P1 | To: P4, with ID4 |
|  | To P5, with ID5 |
| From P2 | To: P6, with ID26 |
| From P3 | To: P7, with ID37 |
| From P 4 | To: P7, with ID47 |
| From P5 | To: P7, with ID56 |
| From P6 | To: P7, with ID67 |

As shown in this example Table 3, as with FIG. 5, each connection leg To, not only has a connection to one or more periods, but also has the interactive data (IDX) associated with that connection where such interactive data may depend on a connection (from and to) rather than being depending on only the connected-to period. That is, according to exemplary embodiments, the interactive data for connecting from P2 to P6 for example is ID26 which might be different than the interactive data for connection from P5 to P6, which is ID56. The interactive information may be passed from the content server 502 to the application, at client 503 and thereby to user interface 501, at the start of a selection window, such as at S0 and/or at S1 in FIG. 6, so that an application may process that data to be used either directly to be displayed to the user or to acquire additional information with respect to the user of the user interface 501. The syntax of the interactive data may be opaque, or otherwise not displayed directly, to the client 502 according to exemplary embodiments.

Figure 7:
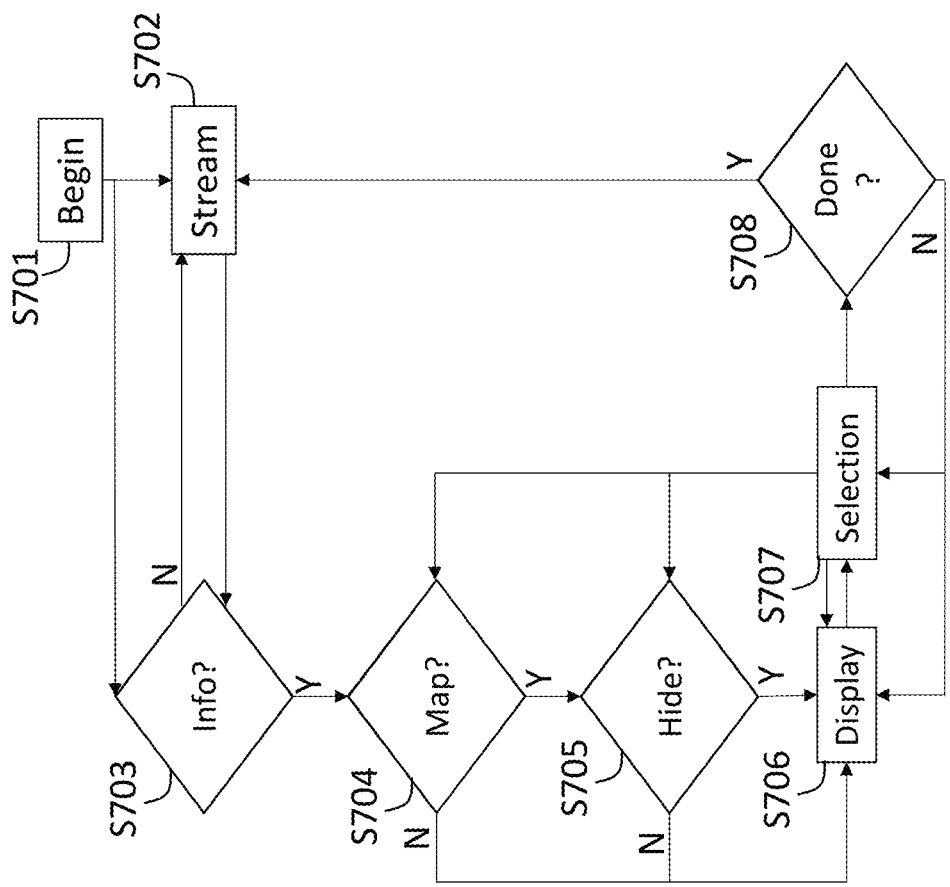
FIG. 7 is a simplified flow chart in accordance with embodiments.
Figure 8:
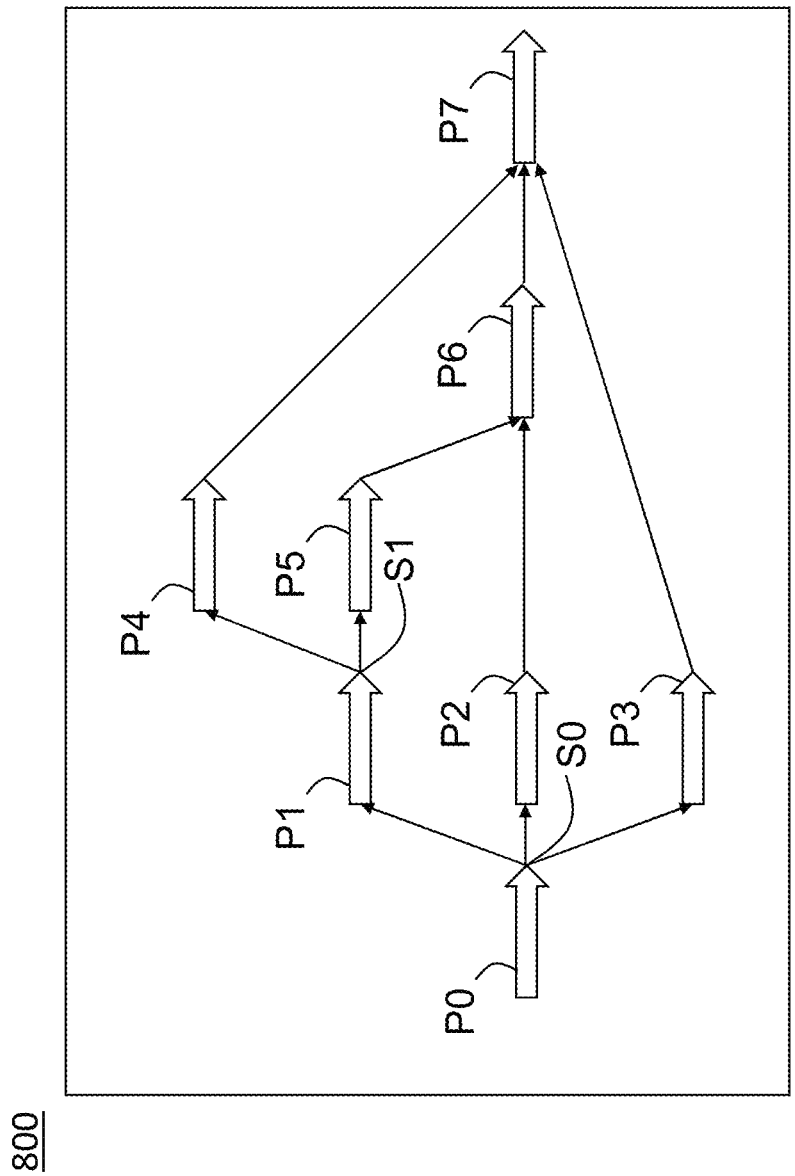
FIG. 8 is a simplified diagram in accordance with embodiments.
Figure 9B:
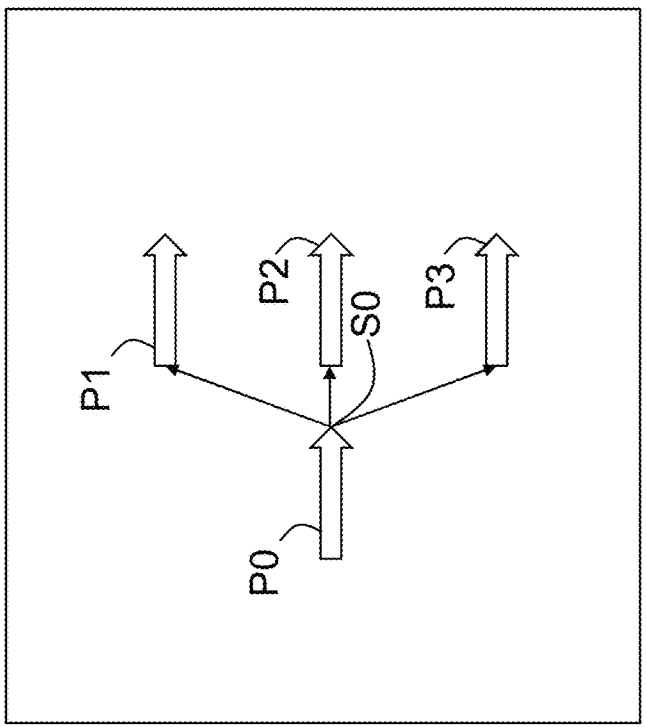
FIG. 9B is a simplified diagram in accordance with embodiments.
Figure 9A:
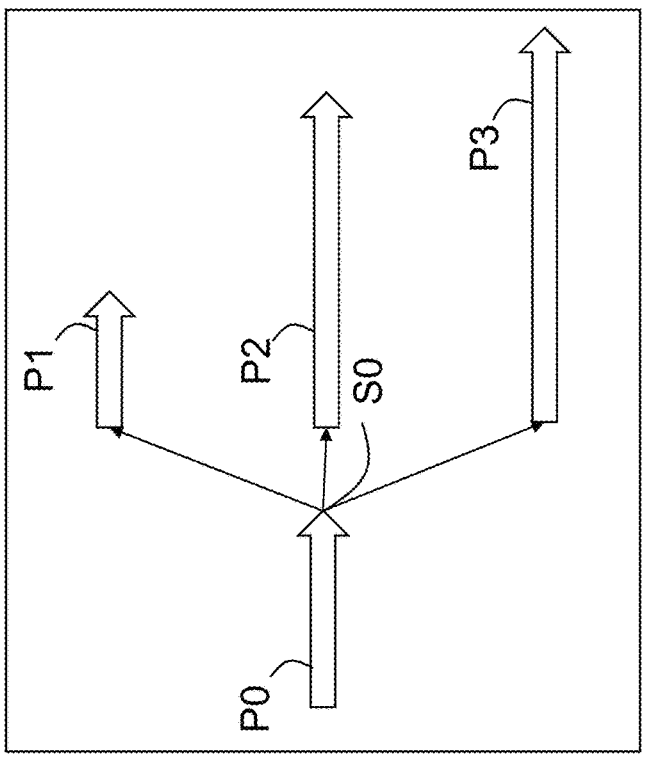
FIG. 9A is a simplified diagram in accordance with embodiments.

FIG. 7 illustrates an exemplary flowchart 700 wherein at S701 a process may begin by either streaming, at S702, media segment data from a server, such as content server 502, to a client device, such as client 503, and at S703, in parallel with or serial to S702, check if the server has provided, to the client device, storyline event as part of one or more MPD updates. If, at S703, such storyline event is determined to be provided to the client device, then at S704 map information may be determined based on, for example a rich connection map of Table 3 above provided from the server, and if such map information, such as shown in FIG. 6, is determined, then at S705, it may also be determined whether to hide or otherwise modify said map information, for example as shown in FIGS. 8, 9A, and 9B as compared to FIG. 6 according to exemplary embodiments. Based on such determination at S705, which may be according to a preset user setting, provided from the user interface to the client, or a preset server setting, provided from the server to the client, a map, such as in any of FIGS. 6, 8, 9A, and 9B, may be displayed to a user. Viewing FIG. 6 for example, at S706, the map 600 may be displayed to the user via one or more of the client 503 and the user interface 501, and at S706, the user may input one or more of a selection S0 and S1 either separately or simultaneously such that based on the user input, via user interface 501, ones of the periods P1, P2, and P3 may be selected based on selection S0, and if P1 is selected, then ones of P4 and P5 may be selected at selection S1. For example, in such embodiment, after S0 selection is made, then at S708, it may be determined whether there is another selection point, such as selection S1, along any of the one or more periods selected at selection S0. If so, then the process may return to S706, and otherwise, the process may proceed to S702 to continue or to otherwise begin streaming based on the one or more selections made by the user.

In contrast, see the exemplary map 800 in FIG. 8 which is similar to the map 600 in FIG. 6 except that according to embodiments, such as at S705 in FIG. 7, it may be determined, by said preset user and/or server settings, that the duration portion of the periods P0-P7 are to be hidden by displaying a size of each of the periods P0-P7 at an equal size to each other. Alternatively, see FIG. 9A and its example map 900A where only the periods with respect to a first selection in time, selection S0 for example, and its respective periods P1-P3 thereafter. That is, although the storylines may be the same as in the map 600, the map 900A illustrates an embodiment of an output to a user where only the periods P1-P3 immediately after a selection S0 are displayed and the other periods P4-P7 are hidden, at least initially, and such information may also be determined as above noted with respect to S705. Similarly, at map 900B of FIG. 9B, as with FIG. 8, it may be determined at S705, by said preset user and/or server settings, that the duration portion of the periods P0-P3 are to be hidden by displaying a size of each of the periods P0-P3 at an equal size to each other as compared to the map 900A of FIG. 9A.

According to exemplary embodiments, each selection, such as at S707, may be required prior to completion of an immediately preceded period. For example, the selection at S0 may be required before completion, or in some embodiments, beginning of the period P0.

Accordingly, exemplary embodiments of the present application achieve a technical solution by providing for selection choices using MPD events with use of additional, interactive data for each possible selection whereby the application can use data or use information to obtain additional data before displaying various selection choices on a user interface. As such, this technical advantage allows for a user to be provided with any of upcoming choices, a partial story map, or an entire story map at a user selection interface for example in addition to allowing for updating the story map. As such exemplary embodiments solve the technical disadvantage that would be presented at least if the map were delivered selection by selection such that the client may only see one selection at a time without a more complete or entire map. Further, an actual period@id may also be hidden to the client while the server nonetheless maintains operability for providing data for any selected period and/or periods. As such, the map can be updated by each event, including past and future connections, and the event may provide a start time and duration (i.e., an event active period) in which the user may be allowed to make a selection. Additionally, in embodiments wherein the event active duration can be set ahead of the transition to the next period, the client may have enough time to buffer the content and have continuous playback which might otherwise not be achieved due to network latency or user selection latency mid-playback for example. Further, according to exemplary embodiments the client can store the map as well as all periods and build an interactive local MPD for playback accordingly.

As such, according to exemplary embodiments there is a method for delivering interactive storyline streaming content, in which a selection is provided at certain moments of time to the user to select the choice among the provided choices to change the story direction, wherein the MPD events are used to convey the selection choices as well as interactive data for each choice for each period, wherein the event can be activated for any duration of time before the actual transition, and therefore provide enough time for client to buffer the selected next period and playback the content with no interruption or rebuffering, wherein the story map can be provided one selection per event, or any number of selections can be provided or the entire story map can be provided in any event, wherein the story map or parts of it can be updated with each or some events, wherein the events can provide choice that their corresponding periods are hidden to the DASH client, and wherein the MPD is updated at the end of each period by adding the period selected by user.

Such method may further include building the story maps gradually or in one step, if it is fully provided, and also storing the corresponding periods, and as such is able to build the entire interactive storyline and manufacture the MPD updates locally with not need to contact the server for MPD and only stream the media content while playing the interactive story.

The method by which the application gets the interactive data along with each choice and it can build an interactive application using the data, where the interactive data can be text or it can be base64 coded of binary data, and therefore it may include images, graphics, GIFs, similies, avatars, animations or even programmatic data that can be used by the application to show the interactions with the user in the user interface.

According to exemplary embodiments, such methods enrich a story map and its edge with interactive information regarding the selection. Having this information provided during the selection window, the application can use the information to display that information or parts of its to the user to provide information or visual guidelines to help its selection, or further process the interactive information to provide rich user-interaction during the selection process. The interactive information can be text, images, animation, programs or a combination for building rich applications.

The techniques described above, can be implemented as computer software using computer-readable instructions and physically stored in one or more computer-readable media or by a specifically configured one or more hardware processors. For example, FIG. 10 shows a computer system 1000 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
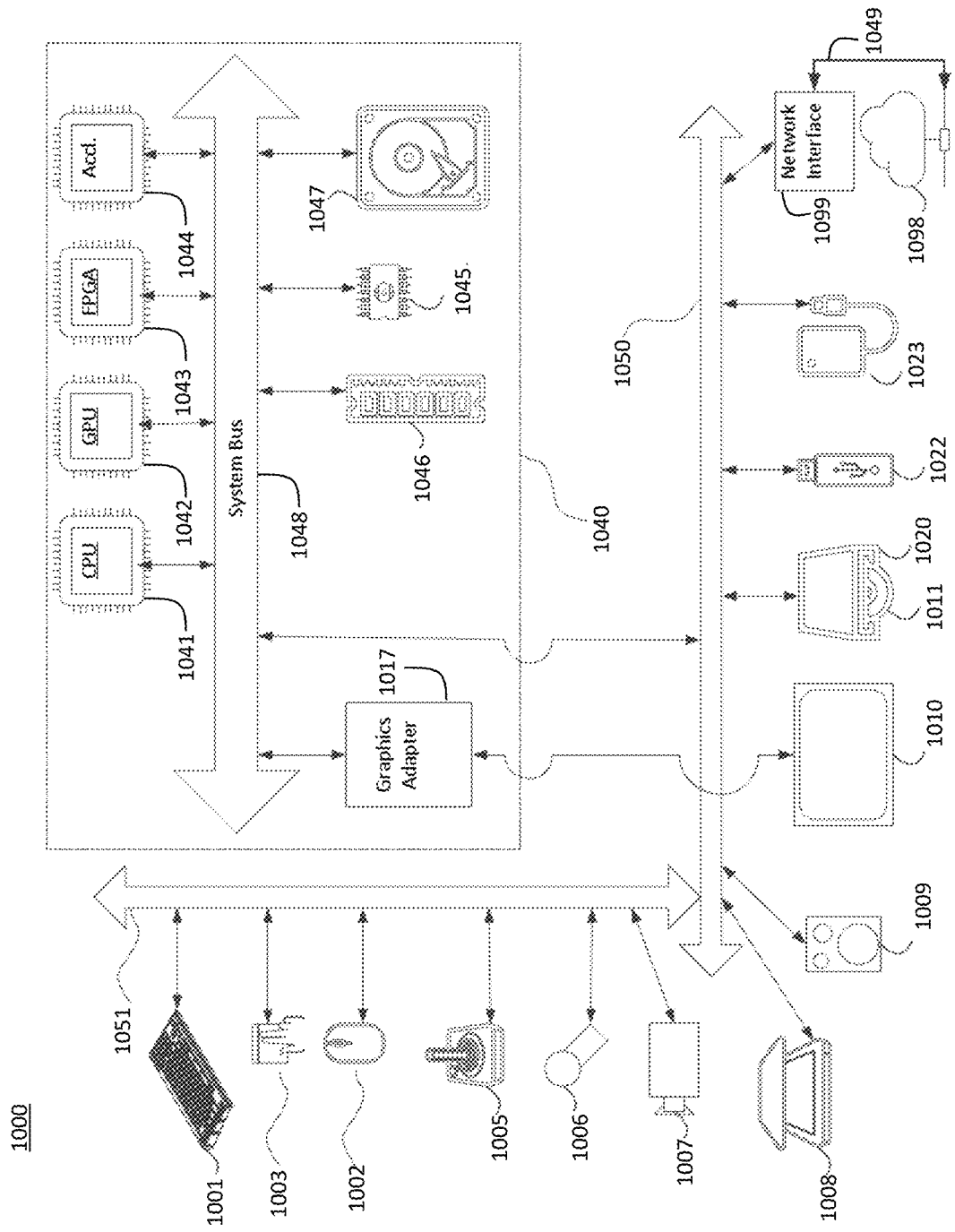
FIG. 10 is a schematic illustration in accordance with embodiments.

The components shown in FIG. 10 for computer system 1000 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, joystick 1005, microphone 1006, scanner 1008, camera 1007.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1010, or joystick 1005, but there can also be tactile feedback devices that do not serve as input devices), audio output devices (such as: speakers 1009, headphones (not depicted)), visual output devices (such as screens 1010 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1000 can also include human accessible storage devices and their associated media such as optical media including CD/DVD ROM/RW 1020 with CD/DVD 1011 or the like media, thumb-drive 1022, removable hard drive or solid state drive 1023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1000 can also include interface 1099 to one or more communication networks 1098. Networks 1098 can for example be wireless, wireline, optical. Networks 1098 can further be local, wide-area, metropolitan, vehicular and industrial, real-time, delay-tolerant, and so on. Examples of networks 1098 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1098 commonly require external network interface adapters that attached to certain general-purpose data ports or peripheral buses (1050 and 1051) (such as, for example USB ports of the computer system 1000; others are commonly integrated into the core of the computer system 1000 by attachment to a system bus as described below (for example Ethernet interface into a PC computer system or cellular network interface into a smartphone computer system). Using any of these networks 1098, computer system 1000 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1040 of the computer system 1000.

The core 1040 can include one or more Central Processing Units (CPU) 1041, Graphics Processing Units (GPU) 1042, a graphics adapter 1017, specialized programmable processing units in the form of Field Programmable Gate Areas (FPGA) 1043, hardware accelerators for certain tasks 1044, and so forth. These devices, along with Read-only memory (ROM) 1045, Random-access memory 1046, internal mass storage such as internal non-user accessible hard drives, SSDs, and the like 1047, may be connected through a system bus 1048. In some computer systems, the system bus 1048 can be accessible in the form of one or more physical plugs to enable extensions by additional CPUs, GPU, and the like. The peripheral devices can be attached either directly to the core's system bus 1048, or through a peripheral bus 1051. Architectures for a peripheral bus include PCI, USB, and the like.

CPUs 1041, GPUs 1042, FPGAs 1043, and accelerators 1044 can execute certain instructions that, in combination, can make up the aforementioned computer code. That computer code can be stored in ROM 1045 or RAM 1046. Transitional data can be also be stored in RAM 1046, whereas permanent data can be stored for example, in the internal mass storage 1047. Fast storage and retrieval to any of the memory devices can be enabled through the use of cache memory, that can be closely associated with one or more CPU 1041, GPU 1042, mass storage 1047, ROM 1045, RAM 1046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1000, and specifically the core 1040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1040 that are of non-transitory nature, such as core-internal mass storage 1047 or ROM 1045. The software implementing various embodiments of the present disclosure can be stored in such devices and executed by core 1040. A computer-readable medium can include one or more memory devices or chips, according to particular needs. The software can cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system can provide functionality as a result of logic hardwired or otherwise embodied in a circuit (for example: accelerator 1044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video streaming, the method comprising:
providing a media presentation description (MPD) event and media segments of video content to be streamed to a client;
controlling the client to provide a user interface based on the MPD event and comprising a plurality of selection choices and interactive data for each of the selection choices based on a connection map; and
updating MPD data based on at least one selection from the selection choices through the user interface,
wherein each of the selection choices indicates respectively different ones of periods of a plurality of storylines of the video content,
wherein controlling the client to provide the user interface comprises providing the user interface before at least a completed playback of at least one other period of the storylines that is prior to the different ones of the periods, and
wherein the connection map links the selection choices by interactive data (IDX) where at least two of the selection choices are both linked to a same, third selection choice by at least different IDX descriptors indicating respective ones of different identifiers in the IDX.

2. The method according to claim 1,
wherein providing the MPD event comprises providing the client with a story map identifying the one other period, the different ones of the periods, and at least one later period of the video content, and
wherein the story map indicates that one other period is scheduled to be streamed before the different ones of the periods which are scheduled to be streamed before the at least one later period of the video content.

3. The method according to claim 2,
wherein at least one of the one other period, the different ones of the periods, and the at least one later period comprises a different duration than at least one other of the one other period, the different ones of the periods, and the at least one later period.

4. The method according to claim 3,
wherein controlling the client to provide the user interface comprises controlling the user interface to display at least a portion of the story map, and
wherein the portion of the story map comprises an indication of the one other period and indications of the different ones of the periods.

5. The method according to claim 4,
wherein controlling the client to provide the user interface comprises controlling the user interface to identify a position of the at least one selection at a point between the indication of the one other period and the indications of the different ones of the periods.

6. The method according to claim 3,
wherein the connection map comprises a listing including each of the one other period, the different ones of the periods, and the at least one later period,
wherein the connection map further comprises first respective identifiers for each connection from the one other period to the different ones of the periods, and
wherein the connection map further comprises a second respective identifier for at least one connection from at least one of the different ones of the periods to the at least one later period.

7. The method according to claim 3,
wherein controlling the client to provide the user interface comprises controlling the user interface to display an entirety of the story map, and
wherein the entirety of the story map comprises an indication of the one other period, indications of the different ones of the periods, and an indication of the at least one later period.

8. The method according to claim 7,
wherein controlling the client to provide the user interface comprises controlling the user interface to identify a position of the at least one selection at a point between the indication of the one other period and the indications of the different ones of the periods, and
wherein controlling the client to provide the user interface further comprises controlling the user interface to identify another position of another selection at a point between at least one of the indications of the different ones of the periods and the indication of the at least one later period.

9. The method according to claim 8,
wherein controlling the user interface to display the entirety of the story map comprises displaying the entirety of the story map based on a connection map,
wherein the connection map comprises a listing including each of the one other period, the different ones of the periods, and the at least one later period,
wherein the connection map further comprises first respective identifiers for each connection from the one other period to the different ones of the periods, and
wherein the connection map further comprises a second respective identifier for at least one connection from at least one of the different ones of the periods to the at least one later period.

10. The method according to claim 1, wherein the client is a dynamic adaptive streaming over HTTP (DASH) client.

11. A apparatus for video streaming, the apparatus comprising:
at least one memory configured to store computer program code;
at least one processor configured to access the computer program code and operate as instructed by the computer program code, the computer program code including:
providing code configured to cause the at least one processor to provide a media presentation description (MPD) event and media segments of video content to be streamed to a client;
controlling code configured to cause the at least one processor to control the client to provide a user interface based on the MPD event and comprising a plurality of selection choices and interactive data for each of the selection choices based on a connection map; and
updating code configured to cause the at least one processor to update MPD data based on at least one selection from the selection choices through the user interface,
wherein each of the selection choices indicates respectively different ones of periods of a plurality of storylines of the video content,
wherein controlling the client to provide the user interface comprises providing the user interface before at least a completed playback of at least one other period of the storylines that is prior to the different ones of the periods, and
wherein the connection map links the selection choices by interactive data (IDX) where at least two of the selection choices are both linked to a same, third selection choice by at least different IDX descriptors indicating respective ones of different identifiers in the IDX.

12. The apparatus according to claim 11,
wherein providing the MPD event comprises providing the client with a story map identifying the one other period, the different ones of the periods, and at least one later period of the video content, and
wherein the story map indicates that one other period is scheduled to be streamed before the different ones of the periods which are scheduled to be streamed before the at least one later period of the video content.

13. The apparatus according to claim 12,
wherein at least one of the one other period, the different ones of the periods, and the at least one later period comprises a different duration than at least one other of the one other period, the different ones of the periods, and the at least one later period.

14. The apparatus according to claim 13,
wherein controlling the client to provide the user interface comprises controlling the user interface to display at least a portion of the story map, and
wherein the portion of the story map comprises an indication of the one other period and indications of the different ones of the periods.

15. The apparatus according to claim 14,
wherein controlling the client to provide the user interface comprises controlling the user interface to identify a position of the at least one selection at a point between the indication of the one other period and the indications of the different ones of the periods.

16. The apparatus according to claim 13,
wherein the connection map comprises a listing including each of the one other period, the different ones of the periods, and the at least one later period,
wherein the connection map further comprises first respective identifiers for each connection from the one other period to the different ones of the periods, and
wherein the connection map further comprises a second respective identifier for at least one connection from at least one of the different ones of the periods to the at least one later period.

17. The apparatus according to claim 13,
wherein controlling the client to provide the user interface comprises controlling the user interface to display an entirety of the story map, and
wherein the entirety of the story map comprises an indication of the one other period, indications of the different ones of the periods, and an indication of the at least one later period.

18. The apparatus according to claim 17,
wherein controlling the client to provide the user interface comprises controlling the user interface to identify a position of the at least one selection at a point between the indication of the one other period and the indications of the different ones of the periods, and wherein controlling the client to provide the user interface further comprises controlling the user interface to identify another position of another selection at a point between at least one of the indications of the different ones of the periods and the indication of the at least one later period.

19. The apparatus according to claim 18, wherein controlling the user interface to display the entirety of the story map comprises displaying the entirety of the story map based on a connection map, wherein the connection map comprises a listing including each of the one other period, the different ones of the periods, and the at least one later period, wherein the connection map further comprises first respective identifiers for each connection from the one other period to the different ones of the periods, and wherein the connection map further comprises a second respective identifier for at least one connection from at least one of the different ones of the periods to the at least one later period.

20. A non-transitory computer readable medium storing a program causing a computer to execute a process, the process comprising:

providing a media presentation description (MPD) event and media segments of video content to be streamed to a client;

controlling the client to provide a user interface based on the MPD event and comprising a plurality of selection choices and interactive data for each of the selection choices based on a connection map; and updating MPD data based on at least one selection from the selection choices through the user interface, wherein each of the selection choices indicates respectively different ones of periods of a plurality of storylines of the video content, wherein controlling the client to provide the user interface comprises providing the user interface before at least a completed playback, and wherein the connection map links the selection choices by interactive data (IDX) where at least two of the selection choices are both linked to a same, third selection choice by at least different IDX descriptors indicating respective ones of different identifiers in the IDX.

* * * * *